(12) United States Patent
Arai et al.

(10) Patent No.: US 11,014,573 B2
(45) Date of Patent: May 25, 2021

(54) VEHICLE CONTROL DEVICE

(71) Applicant: HONDA MOTOR CO., LTD., Tokyo (JP)

(72) Inventors: Kentaro Arai, Wako (JP); Masayuki Sadakiyo, Wako (JP); Hisashi Ishikawa, Wako (JP); Takashi Adachi, Wako (JP); Tomoyuki Noguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 297 days.

(21) Appl. No.: 16/209,024

(22) Filed: Dec. 4, 2018

(65) Prior Publication Data
US 2019/0168770 A1 Jun. 6, 2019

(30) Foreign Application Priority Data
Dec. 4, 2017 (JP) .............................. JP2017-232661

(51) Int. Cl.
B60W 50/08 (2020.01)
B60W 20/20 (2016.01)
(Continued)

(52) U.S. Cl.
CPC .............. B60W 50/082 (2013.01); B60K 6/36 (2013.01); B60K 6/442 (2013.01); B60W 10/06 (2013.01);
(Continued)

(58) Field of Classification Search
CPC .... B60W 50/082; B60W 10/06; B60W 10/08; B60W 10/10; B60W 10/20; B60W 20/10;
(Continued)

(56) References Cited

U.S. PATENT DOCUMENTS

2006/0060399 A1* 3/2006 Tabata .................. B60W 20/30
180/65.23
2006/0287798 A1* 12/2006 Inoue .................. B60L 15/2072
701/70

(Continued)

FOREIGN PATENT DOCUMENTS

CN 107310556 A * 11/2017 ...... B60W 30/18072
CN 206686554 U * 12/2017
(Continued)

OTHER PUBLICATIONS

Tang-Hsien, "Initial Control Algorithm for Switching-In and Switching-Out an Automatic Steering System: Advance-F," 1996, Publisher: IEEE.*
(Continued)

Primary Examiner — Tuan C To
(74) Attorney, Agent, or Firm — Westerman, Hattori, Daniels & Adrian, LLP

(57) ABSTRACT

A vehicle control device performs a drive mode switching control including switching a drive mode, when a request for switching to a manual drive control is made during execution of an automated drive control, to one of a plurality of drive modes that allows a driving force to accord with a required driving force based on an operation of the driver of the vehicle, over a wide range.

8 Claims, 9 Drawing Sheets

(51) Int. Cl.
 B60W 20/30 (2016.01)
 B60W 10/06 (2006.01)
 B60W 10/08 (2006.01)
 B60W 10/20 (2006.01)
 B60W 10/10 (2012.01)
 B60W 20/10 (2016.01)
 B60K 6/442 (2007.10)
 B60K 6/36 (2007.10)
 B60K 6/40 (2007.10)

(52) U.S. Cl.
 CPC ............ *B60W 10/08* (2013.01); *B60W 10/10* (2013.01); *B60W 10/20* (2013.01); *B60W 20/10* (2013.01); *B60W 20/20* (2013.01); *B60W 20/30* (2013.01); *B60K 6/40* (2013.01); *B60W 2540/215* (2020.02); *B60W 2710/06* (2013.01); *B60W 2710/08* (2013.01); *B60W 2710/10* (2013.01); *B60W 2710/20* (2013.01); *B60Y 2200/92* (2013.01)

(58) Field of Classification Search
 CPC .... B60W 20/20; B60W 20/30; B60W 20/254; B60W 20/215; B60W 2710/06; B60W 2710/08; B60W 2710/10; B60W 2710/20; B60K 6/36; B60K 6/442; B60K 6/40; B60Y 2200/92
 USPC ............................................................ 701/22
 See application file for complete search history.

(56) References Cited

U.S. PATENT DOCUMENTS

| | | | | |
|---|---|---|---|---|
| 2007/0268159 A1* | 11/2007 | Futamura | ............... | B60Q 1/143 340/933 |
| 2009/0171540 A1* | 7/2009 | Sugiura | ............... | F16H 61/21 701/52 |
| 2010/0318267 A1* | 12/2010 | Murata | ............... | F16H 61/0213 701/52 |
| 2012/0029796 A1* | 2/2012 | Chen | ............... | B60W 30/18018 701/113 |
| 2012/0150396 A1* | 6/2012 | Ajimoto | ............... | F16H 61/0213 701/52 |
| 2013/0226387 A1* | 8/2013 | Hayashi | ............... | B60W 50/06 701/22 |
| 2016/0033964 A1* | 2/2016 | Sato | ............... | B60K 28/06 701/24 |
| 2016/0304078 A1* | 10/2016 | Imamura | ............... | B60K 6/445 |
| 2017/0088144 A1* | 3/2017 | Shibata | ............ | G08G 1/096716 |
| 2017/0315550 A1* | 11/2017 | Ichikawa | .......... | B60W 60/0051 |
| 2018/0022354 A1* | 1/2018 | Akatsuka | ............. | B60W 10/04 701/41 |
| 2018/0148063 A1* | 5/2018 | Tatsushiro | ............ | B60W 10/06 |
| 2019/0011914 A1* | 1/2019 | Park | ............... | B60W 50/14 |

FOREIGN PATENT DOCUMENTS

| | | | | |
|---|---|---|---|---|
| EP | 3217318 A2 * | 9/2017 | ............ | B60W 30/09 |
| EP | 3115272 B1 * | 11/2017 | ............ | B60W 10/18 |
| JP | 09254676 A * | 9/1997 | ........ | F16H 59/0204 |
| JP | 2014-051255 A | 3/2014 | | |
| JP | 2015-112958 A | 6/2015 | | |
| JP | 2016-222150 A | 12/2016 | | |
| JP | 2017-146819 A | 8/2017 | | |
| JP | 2017-159885 A | 9/2017 | | |
| JP | 2017197183 A * | 11/2017 | | |
| WO | WO-2016121710 A1 * | 8/2016 | ............ | B60W 30/10 |

OTHER PUBLICATIONS

Nobutaka et al., "Performance Improvement of Flow Switching with Automatic Maintenance of Hash Table Assisted by Wildcard Flow Entries," 2012, Publisher: IEEE.*

Office Action dated Oct. 8, 2019, issued in counterpart JP application No. 2017-232661, with English translation. (6 pages).

Office Action dated Jun. 4, 2019, issued in counterpart JP application No. 2017-232661, with English translation. (10 pages).

* cited by examiner

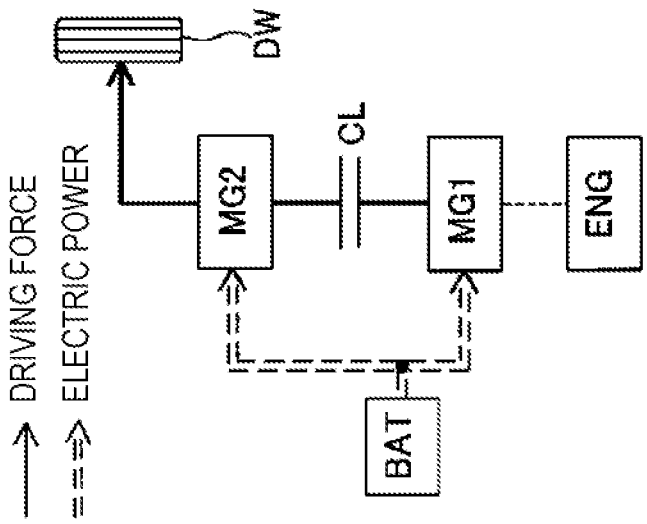
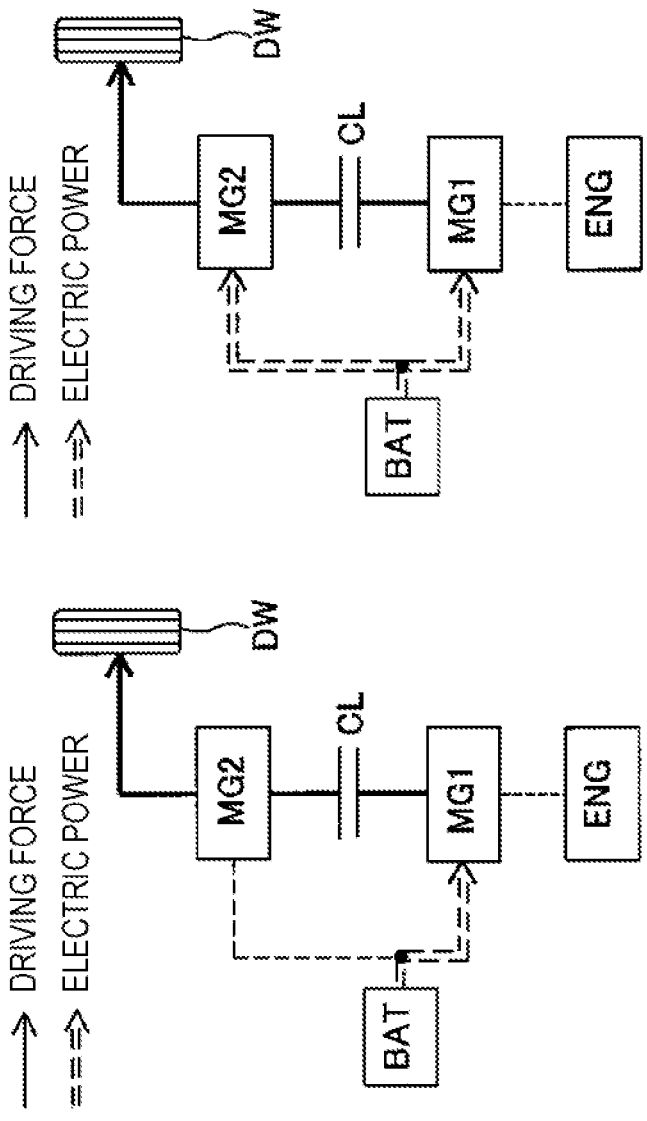
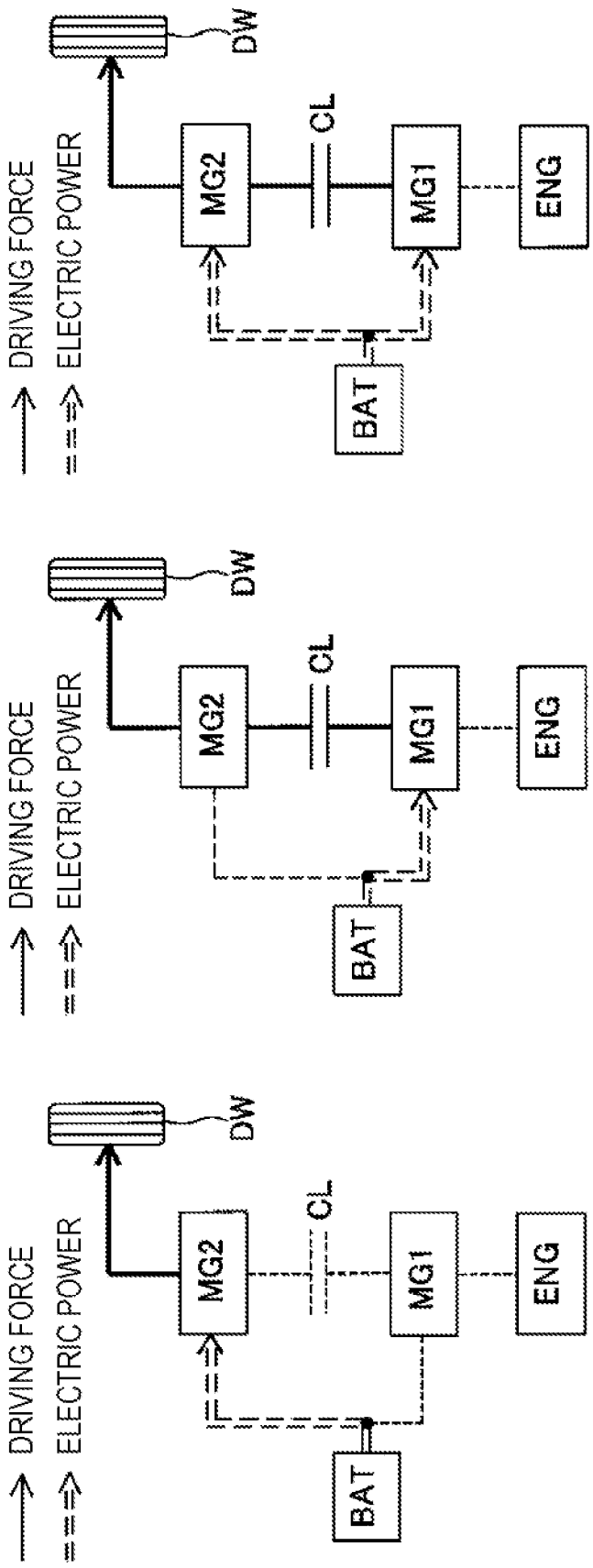

VEHICLE CONTROL DEVICE

CROSS REFERENCES TO RELATED APPLICATIONS

The present application claims priority under 35 U.S.C. § 119 to Japanese Patent Application No. 2017-232661, filed Dec. 4, 2017, entitled "Vehicle Control Device". The contents of this application are incorporated herein by reference in their entirety.

BACKGROUND

1. Field

The present disclosure relates to a vehicle control device, and more particularly to a vehicle control device configured to perform an automated drive control, by automatically controlling at least one of acceleration and deceleration, and steering, of the own vehicle.

2. Description of the Related Art

For example as disclosed in Japanese Unexamined Patent Application Publication No. 2017-146819, a vehicle control device has been developed that includes an automated drive control unit, configured to automatically control at least one of acceleration or deceleration and steering of the own vehicle, to thereby allow the own vehicle to run along a predetermined route as far as a destination.

With the mentioned vehicle control device, the driving mode is switched to a manual drive control by which the steering, the acceleration, and the deceleration of the vehicle are controlled according to the operation of the driver, when the driver operates a select switch, or one of the operators such as the steering wheel, the brake pedal, or the accelerator pedal, during the execution of the automated drive control, by which at least one of the steering and the acceleration or deceleration of the vehicle is automatically controlled.

When the automated drive control, which is currently being performed, is to be switched to the manual drive control as above, it is desirable that the driver of the vehicle can smoothly and naturally take over the operation of the vehicle. For such a purpose, a technique to surely output an appropriate driving force, which accords with a driving force required through the operation of the driver, at the time of switching, or immediately after the switching, to the manual drive control, has to be developed.

SUMMARY

One embodiment according to the present disclosure provides a vehicle control device configured to output an appropriate driving force, which accords with a driving force required by the driver, at the time of switching or immediately after the switching from the automated drive control to the manual drive control, to thereby allow the driver of the vehicle to smoothly and naturally take over the operation of the vehicle, when the automated drive control is switched to the manual drive control.

In an aspect, the present disclosure provides a vehicle control device (a vehicle controller) including a control device (a controller) that allows switching between an automated drive control including automatically controlling at least one of steering and acceleration or deceleration of a vehicle, and a manual drive control including controlling the steering and the acceleration or deceleration of the vehicle according to an operation of a driver. The vehicle includes a traction force (driving force) output unit that outputs a driving force for traction. The traction force (driving force) output unit includes at least one of an internal combustion engine and an electric motor, serving as a drive source, and is configured to switch between a plurality of drive modes. The control device is configured to perform a drive mode switching control including switching one of the drive modes including at least two drive modes with different output-allowable ranges or limits which allow the drive force to output in an amount that accords to the requested amount of the driving force from the driver, such that the control device is able to switch the drive mode, when a request for switching to the manual drive control is made during execution of the automated drive control, to one of the plurality of drive modes that allows the driving force to accord with a required driving force based on the operation of the driver (a first drive mode), over a wide range which is wider than those allowed in the other drive modes (a second drive mode).

With the mentioned vehicle control device, the drive mode switching control is performed, when a request for switching to the manual drive control is made during execution of the automated drive control, to switch the drive mode of the traction force (driving force) output unit to one of the plurality of drive modes that allows the driving force to accord, over a wide range, with the required driving force based on the operation of the driver. Accordingly, an appropriate driving force, which accords with the driving force required through the operation of the driver of the vehicle, can be outputted at the time of switching, or immediately after the switching, to the manual drive control. Therefore, the driver of the vehicle can smoothly and naturally take over the operation of the vehicle, when the automated drive control is switched to the manual drive control.

With the mentioned vehicle control device, the automated drive control may be switched to the manual drive control, under the drive mode switching control, after the drive mode is switched to the mode that allows the driving force to accord with the required driving force, over a wide range.

Switching thus from the automated drive control to the manual drive control, under the drive mode switching control, after the drive mode is switched to the mode that allows the driving force to accord with the required driving force over a wide range, ensures outputting of an appropriate driving force that accords with the driving force required through the operation of the driver of the vehicle, when the automated drive control is switched to the manual drive control. Therefore, the driver of the vehicle can more smoothly and naturally take over the operation of the vehicle, when the automated drive control is switched to the manual drive control.

Alternatively, the drive mode switching control may include both of switching the drive mode to the mode that allows the driving force to accord with the required driving force over a wide range, and switching from the automated drive control to the manual drive control, at the same time.

Switching thus the drive mode, under the drive mode switching control, to the mode that allows the driving force to accord with the required driving force over a wide range, and switching from the automated drive control to the manual drive control at the same time, prevents the timing for switching from the automated drive control to the manual drive control from being delayed. Therefore, the automated drive control can be smoothly switched to the manual drive control.

In the foregoing vehicle control device, the drive mode may include an electric motor running mode (EV running mode) in which only a driving force of the electric motor is utilized to let the vehicle run, and the drive mode that allows the driving force to accord with the required driving force over a wide range may be a drive mode other than the electric motor running mode.

In the case of the electric motor running mode, in which only the driving force of the electric motor is utilized to let the vehicle run, the range of the driving force that can be attained differs depending on a state of charge (SOC) of an energy storage that supplies power to the electric motor. Accordingly, a sufficient range of the driving force that accords with the required driving force may not always be attained, depending on the condition of the system, including the SOC of the energy storage. Thus, an appropriate driving force that accords with the driving force, required through the operation of the driver of the vehicle performed under the manual drive control, may fail to be outputted. Therefore, it is desirable that, under the drive mode switching control, the drive mode is switched to a mode other than the electric motor running mode.

In the foregoing vehicle control device, the drive mode may include a running mode in which at least the internal combustion engine is activated to let the vehicle run, and the drive mode that allows the driving force to accord with the required driving force over a wide range may correspond to the running mode in which at least the internal combustion engine is activated to let the vehicle run.

In the running mode in which the internal combustion engine is activated to let the vehicle run, the range of the driving force that can be outputted can be increased, since the internal combustion engine is utilized to let the vehicle run. Accordingly, setting to the mentioned running mode under the drive mode switching control enables an appropriate driving force that accords with the driving force, required through the operation of the driver of the vehicle, to be outputted under the manual drive control. Here, the expression "activating the internal combustion engine" herein refers not only to utilizing the internal combustion engine for outputting the driving force for the running vehicle, but also to utilizing the output of the engine for other purposes, such as power generation.

In the foregoing vehicle control device, the traction force (driving force) output unit may be configured to switch between a series running mode, in which the driving force of the electric motor is utilized to let the vehicle run, and the internal combustion engine is primarily utilized for power generation, and a parallel running mode in which the driving force of either or both of the electric motor and the internal combustion engine is utilized to let the vehicle run, and the drive mode that allows the driving force to accord with the required driving force over a wide range may correspond to the series running mode.

With the system configured to switch between the series running mode, in which the driving force of the electric motor is utilized to let the vehicle run, and the internal combustion engine is primarily utilized for power generation, and the parallel running mode in which the driving force of either or both of the electric motor and the internal combustion engine is utilized to let the vehicle run, the series running mode may provide a wider range of driving force that accords with the required driving force (i.e., provide a higher degree of freedom of driving force) compared with the parallel running mode, depending on the configuration of the power transmission route. This is because, in the series running mode, the operation range on a driving force line graph may become wider, and the driving force that can be outputted does not depend on the SOC of the energy storage. In such a case, therefore, selecting the series running mode under the drive mode switching control enables outputting of an appropriate driving force that accords with the driving force, required through the operation of the driver of the vehicle performed under the manual drive control.

In the foregoing vehicle control device, the traction force (driving force) output unit may include a transmission including a first input shaft connected to the electric motor, and selectively connected to the internal combustion engine via a first power transmission element, a second input shaft selectively connected to the internal combustion engine via a second power transmission element, an output shaft that outputs driving force to a driving wheel, a first transmission mechanism having a plurality of transmission gears selectively engaged with the first input shaft, and a second transmission mechanism having another plurality of transmission gears selectively engaged with the second input shaft. The plurality of drive modes may include an internal combustion engine running mode in which, while the internal combustion engine is in operation, one of the first power transmission element and the second power transmission element is connected to the internal combustion engine, to let the vehicle run with the driving force of the internal combustion engine, and the drive mode that allows the driving force to accord with the required driving force over a wide range may correspond to the internal combustion engine running mode.

With the traction force (driving force) output unit including the mentioned transmission, the internal combustion engine running mode, in which one of the first power transmission element and the second power transmission element is connected to the internal combustion engine actually in operation, to let the vehicle run with the driving force of the internal combustion engine, provides a wider range of driving force that accords with the required driving force (i.e., provides a higher degree of freedom of driving force). This is because, in the drive mode in which the internal combustion engine is in operation, utilizing the driving force of the internal combustion engine leads to increased degree of freedom of the driving force. Therefore, selecting the internal combustion engine running mode under the drive mode switching control enables outputting of an appropriate driving force that accords with the driving force, required through the operation of the driver of the vehicle performed under the manual drive control. In another aspect, a vehicle including the vehicle control device disclosed in the present application is provided. The word "unit" used in the present application may mean a physical part or component of computer hardware or any device including a controller, a processor, a memory, etc., which is particularly configured to perform functions and steps disclosed in the application.

BRIEF DESCRIPTION OF THE DRAWINGS

FIG. 3A to 3C are schematic diagrams each showing transmission of driving force and electric power, under an EV running mode.

DESCRIPTION OF THE PREFERRED EMBODIMENTS

Hereafter, embodiments of the present disclosure will be described, with reference to the accompanying drawings.

First Embodiment

Figure 1:
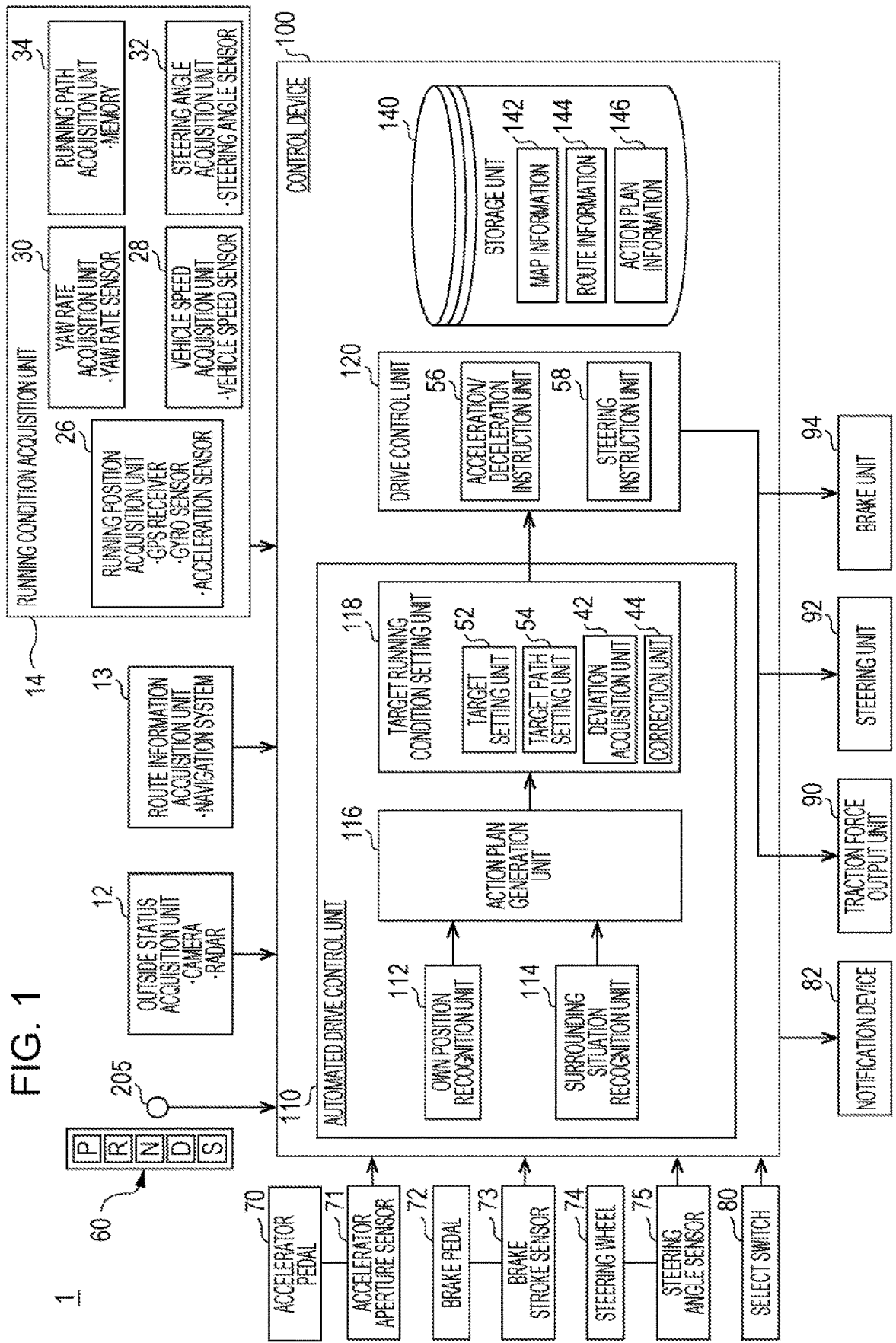
FIG. 1 is a functional block diagram of a vehicle control device according to a first embodiment of the present disclosure.

FIG. 1 is a functional block diagram of a control device 100 mounted in a vehicle 1. The configuration of the control device 100 will be described, with reference to FIG. 1. The vehicle 1 (own vehicle) on which the control device 100 is mounted is an automobile such as a bicycle, tricycle, or a four-wheel vehicle, and encompasses an automobile that utilizes an internal combustion engine such as a diesel engine or a gasoline engine as a drive source, an electric vehicle that utilizes an electric motor as a drive source, and a hybrid vehicle having both the internal combustion engine and the electric motor. The electric vehicle is driven by power discharged from a secondary battery, a hydrogen fuel cell, a metal fuel cell, an alcohol fuel cell, or the like.

The vehicle 1 includes devices for acquiring information from outside, which are an outside status acquisition unit 12, a route information acquisition unit 13, and a running condition acquisition unit 14. The vehicle 1 also includes operation devices such as an accelerator pedal 70, a brake pedal 72, a steering wheel 74, and a select switch 80, operation detection sensors such as an accelerator aperture sensor 71, a brake stroke sensor (brake switch) 73, and a steering angle sensor (or steering torque sensor) 75, and a notification device (output unit) 82. Further, the vehicle 1 includes driving and steering devices, which are a traction force (driving force) output unit (driving unit) 90, a steering unit 92, and a brake unit 94, and also the control device 100 that controls the mentioned devices. The mentioned devices and units are connected to each other via a multiplex communication line such as a controller area network (CAN) communication line, or via a serial communication line or a wireless communication network. The above-cited operation devices are merely exemplary, and buttons, dial switches, or graphical user interface (GUI) switches may be mounted in the vehicle 1.

The outside status acquisition unit 12 is configured to acquire environmental information indicating the situation outside the vehicle 1, for example the lanes on the road and objects around the vehicle. The outside status acquisition unit 12 includes, for example, various types of cameras (e.g., a monocular camera, a stereoscopic camera, and an infrared camera) and radars (e.g., a millimeter-wave radar, a microwave radar, and a laser radar). In addition, a fusion sensor that integrates the information acquired through the camera and the information acquired through the radar may also be employed.

The route information acquisition unit 13 includes a navigation system. The navigation system includes a global navigation satellite system (GNSS) receiver, map information (navigation map), a touch panel display unit serving as a user interface, a speaker, and a microphone. The navigation system identifies the position of the vehicle 1 with the GNSS receiver, and works out the route from the identified position to a destination designated by the user. The route presented by the navigation system is stored in a storage unit 140 as route information 144. The position of the vehicle 1 may be identified or supplemented by an inertial navigation system (INS) that utilizes the output of the running condition acquisition unit 14. The navigation system also outputs a guidance about the route to the destination, by audible announcement or screen display, while the control device 100 is performing a manual drive control. Here, the system for identifying the position of the vehicle 1 may be provided independent from the navigation system. The navigation system may be realized by a function of the user's terminal device, such as a smartphone or a tablet terminal. In this case, the information is transmitted and received through wireless or wired communication between the terminal device and the control device 100.

The running condition acquisition unit 14 is configured to acquire the actual running condition of the vehicle 1. The running condition acquisition unit 14 includes a running position acquisition unit 26, a vehicle speed acquisition unit 28, a yaw rate acquisition unit 30, a steering angle acquisition unit 32, and a running path acquisition unit 34.

The running position acquisition unit 26 is configured to acquire the running position and the posture (moving direction) of the vehicle 1, which are factors of the running condition. The running position acquisition unit 26 includes various types of positioning apparatuses, for example a GPS receiver, a GNSS receiver, and a beacon receiver, configured to receive an electromagnetic wave from a satellite or an on-road equipment, to thereby acquire the position information (e.g., latitude, longitude, altitude, and coordinate), and also a gyro sensor and an acceleration sensor. The running position of the vehicle 1 is measured with respect to a specific point on the vehicle 1.

The vehicle speed acquisition unit 28 is configured to acquire the speed of the vehicle 1 (hereinafter, vehicle speed), which is a factor of the running condition. The vehicle speed acquisition unit 28 includes a speed sensor mounted on one or more wheels.

The yaw rate acquisition unit 30 is configured to acquire the yaw rate of the vehicle 1, which is a factor of the running condition. The yaw rate acquisition unit 30 includes, for example, a yaw rate sensor.

The steering angle acquisition unit 32 is configured to acquire the steering angle of the vehicle 1, which is a factor of the running condition. The steering angle acquisition unit 32 includes, for example, a steering angle sensor provided on a steering shaft. In this embodiment, a steering angular speed and steering angular acceleration are also acquired, on the basis of the steering angle acquired.

The running path acquisition unit 34 is configured to acquire information of the actual running path of the vehicle 1, which is a factor of the running condition. The actual running path includes the track (locus) on which the vehicle 1 has actually travelled, and may also include the path about to be travelled, in other words the forward extension of the track (locus) already travelled. The running path acquisition unit 34 includes a memory. The memory stores position information including a string of series of points included in the actual running path. The extension can be predicted, for example with a computer.

The operation detection sensors, namely the accelerator aperture sensor 71, the brake stroke sensor 73, and the steering angle sensor 75 respectively output an accelerator aperture, a brake stroke, and a steering angle, to the control device 100 as detection result.

The select switch 80 is to be operated by a passenger of the vehicle 1. Upon being operated by the passenger, the select switch 80 switches the drive mode (e.g., between automated drive control and manual drive control), according to the operation performed by the passenger. The select switch 80 generates a drive mode designation signal indicating the drive mode to be performed, according to the operation performed by the passenger, and outputs the signal to the control device 100.

The vehicle 1 according to this embodiment also includes a shifting unit 60, to be operated by the driver via a non-illustrated shift lever. The positions of the shift lever of the shifting unit 60 include, as shown in FIG. 1, parking (P), reverse running (R), neutral (N), automatic forward running (normal mode) (D), and forward running in sport mode (S). A shift position sensor 205 is provided close to the shifting unit 60. The shift position sensor 205 detects the position of the shift lever operated by the driver. The information of the shift position detected by the shift position sensor 205 is inputted to the control device 100.

The notification device 82 includes various types of components capable of outputting information. The notification device 82 outputs, for example, information for urging the passenger of the vehicle 1 to switch from the automated drive control to the manual drive control. The notification device 82 may include, for example, at least one of a speaker, a vibrator, a display unit, and a light emitting device.

Figure 2:
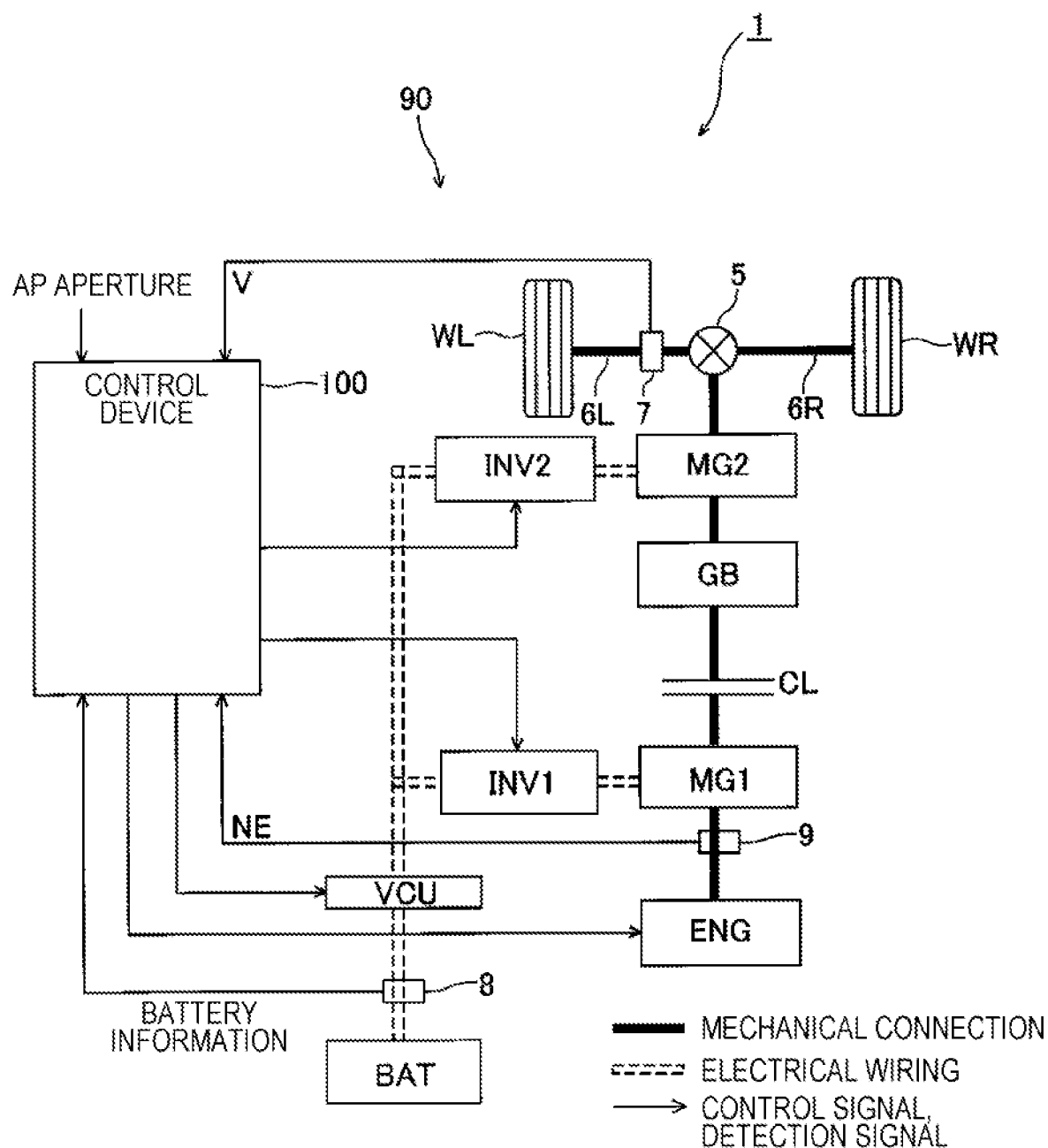
FIG. 2 is a schematic diagram showing a configuration of a traction force (driving force) output unit (driving unit) of a vehicle, according to the first embodiment.

The traction force (driving force) output unit (driving unit) 90 of the vehicle 1 according to this embodiment includes, as shown in FIG. 2, an engine ENG and a first and second motor generators MG1 and MG2, that each serve as a drive source. In addition, when the vehicle 1 is an electric vehicle that includes an electric motor as a drive source, the traction force (driving force) output unit 90 may include a drive motor, and a motor ECU that controls the drive motor. When the traction force (driving force) output unit 90 is constituted of an engine and an automatic transmission, the traction force (driving force) output unit 90 may include a fuel injection electronic control unit (FI-ECU) that controls the engine, and an AT-ECU that controls the automatic transmission.

The steering unit 92 includes, for example, an electric motor. The electric motor applies a force to, for example, a rack and pinion mechanism, to change the direction of the associated wheel. The steering unit 92 drives the electric motor to change the direction of the wheel, according to information inputted from a drive control unit 120.

The brake unit 94 is, for example, an electric servo brake unit including a brake caliper, a cylinder for transmitting a hydraulic pressure to the brake caliper, an electric motor that generates the hydraulic pressure in the cylinder, and a brake control unit. The brake control unit of the electric servo brake unit controls the electric motor according to information inputted from the drive control unit 120, to output a braking force or brake torque based on the braking operation, to the wheels. The electric servo brake unit may include, as a backup device, a mechanism that transmits a hydraulic pressure generated by the operation of the brake pedal 72 to the cylinder, via a master cylinder. Here, the brake unit 94 may be an electronically controlled hydraulic pressure brake unit, instead of the electric servo brake unit. The electronically controlled hydraulic pressure brake unit controls an actuator according to information inputted from the drive control unit 120, to transmit the hydraulic pressure of the master cylinder to each cylinder. When the traction force (driving force) output unit 90 includes a drive motor, the brake unit 94 may include a regenerative brake based on the drive motor.

Hereunder, the control device (vehicle control device) 100 will be described. The control device 100 includes an automated drive control unit 110, the drive control unit 120, and the storage unit 140. The automated drive control unit 110 includes an own position recognition unit 112, a surrounding situation recognition unit 114, an action plan generation unit 116, and a target running condition setting unit 118. The components of the automated drive control unit 110, and a part or the whole of the drive control unit 120 are realized, when a processor such as a central processing unit (CPU) executes a corresponding program. Alternatively, a part or the whole of the cited components may be realized by hardware such as a large scale integration (LSI) or an application specific integrated circuit (ASIC). The storage unit 140 may include a read-only memory (ROM), a random-access memory (RAM), a hard disk drive (HDD), and a flash memory. The program to be executed by the processor may be stored in the storage unit 140 in advance, or downloaded from an external device through an in-vehicle internet device. The program may be installed in the storage unit 140, by mounting a portable storage medium containing the program on a non-illustrated driving device. The control device 100 may be separated into a plurality of computer devices. In this case, the foregoing hardware functional units and the software including the programs can be made to collaborate with the in-vehicle computer of the vehicle 1, to thereby realize the functions according to this embodiment.

The automated drive control unit 110 switches the drive mode to be controlled, according to the signal inputted from the select switch 80. The drive modes include, but are not limited to, the automated drive control by which the acceleration, deceleration, and steering of the vehicle 1 are automatically controlled, and the manual drive control by which the acceleration and deceleration of the vehicle 1 are controlled according to an operation performed on the operation device such as the accelerator pedal 70 and the brake pedal 72, and the steering is controlled according to an operation performed on the operation device such as the steering wheel 74. Other examples of the drive mode include a semi-automated drive control, by which one of the acceleration or deceleration and the steering of the vehicle 1 is automatically controlled, and the other is controlled according to the operation performed on the operation device. Hereinafter, the term "automated drive" will refer to both of the automated drive and the semi-automated drive.

When the manual drive control is performed, the automated drive control unit 110 may suspend the operation, and the signals from the operation detection sensors may be outputted either to the drive control unit 120, or directly to each of the traction force (driving force) output unit 90, the steering unit 92, and the brake unit 94.

The own position recognition unit 112 of the automated drive control unit 110 recognizes a lane (running lane) on which the vehicle 1 is running, and the position of the vehicle 1 relative to the running lane, on the basis of the information inputted from the map information 142 stored in the storage unit 140, the outside status acquisition unit 12, the route information acquisition unit 13, or the running condition acquisition unit 14. The map information 142 is more detailed than, for example, the navigation map possessed by the route information acquisition unit 13, and includes information of the center of the lane, and the boundary between the lanes. More specifically, the map information 142 includes road information, traffic regulation information, address information (e.g., address and zip code), facility information, and phone number information. The road information includes information indicating the type of the road such as a highway, a toll road, a national road, and a prefectural road, the number of lanes, the width of each lane, the gradient of the road, the position of the road (e.g., three-dimensional coordinate including longitude, latitude, and altitude), the curvature of a curve of the lane, a position of a merge point and a branch point of the lane, and signs provided along the road. The traffic regulation information includes, for example, information of roadblock due to road construction, traffic accidents, or traffic jam.

The own position recognition unit 112 recognizes, for example, a deviation of the reference point (e.g., center of gravity) of the vehicle 1 from the center of the running lane, and an angle of the running direction of the vehicle 1 with respect to the line connecting the center of the running lane, as relative position of the vehicle 1 with respect to the running lane. Alternatively, the own position recognition unit 112 may recognize the position of the reference point of the vehicle 1 with respect to either side edge of the lane on which the vehicle 1 is running, as the relative position of the vehicle 1 with respect to the running lane.

The surrounding situation recognition unit 114 recognizes the situation of each of surrounding vehicles, such as position, speed, and acceleration, according to information inputted from the outside status acquisition unit 12. In this embodiment, the surrounding vehicles will refer to other vehicles running in the vicinity of the vehicle 1, in the same direction as the vehicle 1. The position of the surrounding vehicle may be indicated by a representative point, such as the center of gravity or corner of the vehicle, or a region representing the contour of the vehicle. The "situation" of the surrounding vehicle may include, for example, the acceleration of the surrounding vehicle, and whether the vehicle is changing, or about to change, the running lane, which can be acquired from the foregoing units. Further, the surrounding situation recognition unit 114 may also recognize the position of a guard rail, a utility pole, a parking vehicle, a pedestrian, and other objects, in addition to the surrounding vehicles.

The action plan generation unit 116 sets a start point of the automated drive, a predicted finish point of the automated drive, and/or a destination of the automated drive. The start point of the automated drive may be the current position of the vehicle 1, or a point where the passenger of the vehicle 1 has instructed to start the automated drive. The action plan generation unit 116 generates an action plan in a section between the start point and the predicted finish point, between the start point and the destination of the automated drive. Without limitation to the above, the action plan generation unit 116 may generate the action plan for an optionally designated section.

The action plan includes, for example, a plurality of events to be sequentially executed. Examples of the events include a deceleration event to decelerate the vehicle 1, an acceleration event to accelerate the vehicle 1, a lane-keep event to prevent the vehicle 1 from deviating from the running lane, a lane-change event to change the running lane, a passing event to let the vehicle 1 pass a preceding vehicle, a branch event to shift to a desired lane, or stay in the current lane at a branch point, and a merge event to accelerate or decelerate the vehicle 1 in a merging lane for a main lane, to thereby change the running lane. For example, at a junction of a toll road (e.g., a highway), the control device 100 changes the lane or stay in the current lane, to let the vehicle 1 to run toward the destination. Accordingly, when it is found that there is a junction on the way, upon looking up the map information 142, the action plan generation unit 116 sets the lane-change event for shifting to a desired lane that allows the vehicle 1 to run toward the destination, at a point between the current position (coordinate) of the vehicle 1 and the position (coordinate) of the junction. Here, the information indicating the action plan generated by the action plan generation unit 116 is stored in the storage unit 140, as action plan information 146.

The target running condition setting unit 118 is configured to set a target running condition, to be realized by the vehicle 1, on the basis of the action plan determined by the action plan generation unit 116, and the information acquired by the outside status acquisition unit 12, the route information acquisition unit 13, and the running condition acquisition unit 14. The target running condition setting unit 118 includes a target setting unit 52 and a target path setting unit 54. The target running condition setting unit 118 also includes a deviation acquisition unit 42 and a correction unit 44.

The target setting unit 52 is configured to set information of a running position (latitude, longitude, altitude, and coordinate) to be realized by the vehicle 1 (hereinafter, simply target position), target value information of the vehicle speed (hereinafter, simply target vehicle speed), and target value information of the yaw rate (hereinafter, simply target yaw rate). The target path setting unit 54 is configured to set information of the target path to be followed by the vehicle 1 (hereinafter, simply target path), on the basis of the surrounding situation acquired by the outside status acquisition unit 12 and the running route information acquired by the route information acquisition unit 13. The target path includes information of the target position at each unit time. The target position is associated with the posture information (running direction) of the vehicle 1. Further, the target value information such as vehicle speed, acceleration, yaw rate, lateral G, steering angle, steering angular speed, and steering angular acceleration may be associated with each of the target positions. The target position, the target vehicle speed, the target yaw rate, and the target path are the information indicating the target running condition.

The deviation acquisition unit 42 is configured to acquire a deviation of the actual running condition from the target running condition, on the basis of the target running condition specified by the target running condition setting unit 118, and the actual running condition acquired by the running condition acquisition unit 14.

The correction unit 44 is configured to correct the target running condition, depending on the deviation acquired by the deviation acquisition unit 42. To be more detailed, the correction unit 44 brings the target running condition specified by the target running condition setting unit 118 closer to the actual running condition acquired by the running condition acquisition unit 14, with an increase in deviation, to thereby set a revised target running condition.

The drive control unit 120 is configured to control the running of the vehicle 1. More specifically, the drive control unit 120 outputs a command value for the running control, so as to match the running condition of the vehicle 1 with, or bring the running condition of the vehicle 1 closer to, the target running condition specified by the target running condition setting unit 118, or the revised target running condition set by the correction unit 44. The drive control unit 120 includes an acceleration/deceleration instruction unit 56 and a steering instruction unit 58.

The acceleration/deceleration instruction unit 56 is configured to control the acceleration and deceleration, out of the running control items of the vehicle 1. More specifically, the acceleration/deceleration instruction unit 56 calculates a command value for the acceleration and deceleration, to match the running condition of the vehicle 1 with the target running condition, on the basis of the target running condition (target acceleration and deceleration) and the actual running condition (actual acceleration and deceleration) set by the target running condition setting unit 118 or the correction unit 44.

The steering instruction unit 58 is configured to control the steering, out of the running control items of the vehicle 1. More specifically, the steering instruction unit 58 calculates a command value for the steering angular speed, to match the running condition of the vehicle 1 with the target running condition, on the basis of the target running condition (target acceleration and deceleration) and the actual running condition (actual acceleration and deceleration) set by the target running condition setting unit 118 or the correction unit 44.

FIG. 2 is a schematic diagram showing a configuration of a traction force (driving force) output unit (driving unit) 90 of the vehicle 1. In general, a hybrid electrical vehicle (HEV) includes a motor generator and an engine, and runs with the driving force of the motor generator and/or the engine, depending on the running condition of the vehicle. The HEV can be broadly classified into a series type and a parallel type. The series-type HEV runs with the driving force of the motor generator. The engine is primarily utilized for power generation, and the power generated by another motor generator based on the driving force of the engine is charged to the battery or supplied to the motor generator. The parallel-type HEV runs with the driving force of one or both of the motor generator and the engine.

The vehicle 1 according to this embodiment is configured to switch between the series system and the parallel system. Accordingly, the traction force (driving force) output unit (driving unit) 90 of the vehicle 1 can switch the transmission system of the driving force to either of the series system and the parallel system, by releasing or engaging (connecting or disconnecting) a clutch depending on the running condition.

The traction force (driving force) output unit 90 shown in FIG. 2 includes an engine ENG serving as a drive source that outputs a rotational driving force, a first motor generator MG1, a second motor generator MG2, a lock-up clutch (hereinafter, simply "clutch") CL, a gear box (hereinafter, simply "gear") GB, a vehicle speed sensor 7, a battery sensor 8, a rotation sensor 9, a battery (energy storage) BAT, a voltage control unit VCU, a first inverter INV1, and a second inverter INV2. In FIG. 2, bold solid lines represent mechanical connection, double broken lines represent electrical wiring, and fine solid arrows represent a control signal or a detection signal.

The engine ENG drives the first motor generator MG1 as a generator, with the clutch CL disconnected. When the clutch CL is engaged, the driving force outputted by the engine ENG is transmitted to the driving wheels WL and WR as mechanical energy to let the vehicle 1 run, via the first motor generator MG1, the clutch CL, the gear GB, the second motor generator MG2, a differential mechanism 5, and drive shafts 6R and 6L.

The first motor generator MG1 is driven by the engine ENG, to generate electric power. The first motor generator MG1 can also act as an electric motor, when the vehicle 1 is braked.

In the second motor generator MG2, the rotor acts as an electric motor with power supplied from at least one of the battery BAT and the first motor generator MG1, and generates the driving force to let the vehicle 1 run. The torque generated by the second motor generator MG2 is transmitted to the driving wheels WL and WR, via the differential mechanism 5 and the drive shafts 6R and 6L. The second motor generator MG2 can also act as a generator, when the vehicle 1 is braked.

The clutch CL connects or disconnects the transmission route of the driving force from the engine ENG to the driving wheels WL and WR, according to an instruction from the vehicle control device 100. When the clutch CL is disconnected, the driving force outputted by the engine ENG is not transmitted to the driving wheels WR and WL, but when the clutch CL is connected, the driving force outputted by the engine ENG is transmitted to the driving wheels WR and WL. The gear GB includes transmission stages or a fixed stage, to change the speed of the driving force from the engine ENG at a predetermined gear ratio, and transmit the driving force to the driving wheels WL and WR. The gear ratio in the gear GB is varied according to the instruction from the vehicle control device 100.

The battery BAT includes a plurality of storage cells connected in series, and supplies a high voltage, for example 100 to 200 V. The storage cell may be, for example, a lithium ion battery or a nickel-hydrogen battery.

The vehicle speed sensor 7 detects the running speed of the vehicle 1 (vehicle speed V). The vehicle speed V is linearly proportional to the rotation speed of the driving wheels WL and WR. Signals indicating the vehicle speed V, detected by the vehicle speed sensor 7, are provided to the vehicle control device 100.

The battery sensor 8 detects an output from the battery BAT (e.g., terminal voltage, charge/discharge current). Signals indicating the terminal voltage or charge/discharge current, detected by the battery sensor 8, are provided to the vehicle control device 100, as battery information.

The rotation sensor 9 detects a rotation speed NE of the engine ENG. Signals indicating the rotation speed NE, detected by the rotation sensor 9, are provided to the vehicle control device 100.

The battery control unit VCU boosts the output voltage of the battery BAT, when the second motor generator MG2 acts as the electric motor. The battery control unit VCU also reduces the output voltage of the second motor generator MG2, when the regenerative power, generated by the second motor generator MG2 upon braking the vehicle 1 and converted to DC, is charged to the battery BAT. Further, the battery control unit VCU reduces the voltage of the power generated by the first motor generator MG1 driven by the engine ENG, and converted to a DC. The power reduced by the battery control unit VCU is charged to the battery BAT.

The vehicle control device 100 controls the operation of the engine ENG, the output of the first motor generator MG1 by controlling the first inverter INV1, the connection/disconnection of the clutch CL, and the output of the second motor generator MG2, by controlling the second inverter INV2. In addition, signals indicating the accelerator pedal aperture (AP aperture) based on the operation of the accelerator pedal 70 (see FIG. 1) by the driver of the vehicle 1, and the signals from the vehicle speed sensor 7 indicating the vehicle speed V are inputted to the vehicle control device 100. The vehicle control device 100 selects the running mode of the vehicle 1 on the basis of the AP aperture and the vehicle speed V, as will be subsequently described, and controls the action of the clutch CL, and the output from each of the engine ENG, the first motor generator MG1, and the second motor generator MG2. Here, the information of the AP aperture is only looked up when the manual drive control is selected.

The traction force (driving force) output unit 90 of the vehicle 1 according to this embodiment is configured to let the vehicle 1 run, in one of an EV running mode (electric motor running mode), a series running mode, and an engine running mode (parallel running mode), in each of which the usage of the drive source, including the engine ENG, the first motor generator MG1, and the second motor generator MG2, is different.

Figure 4:
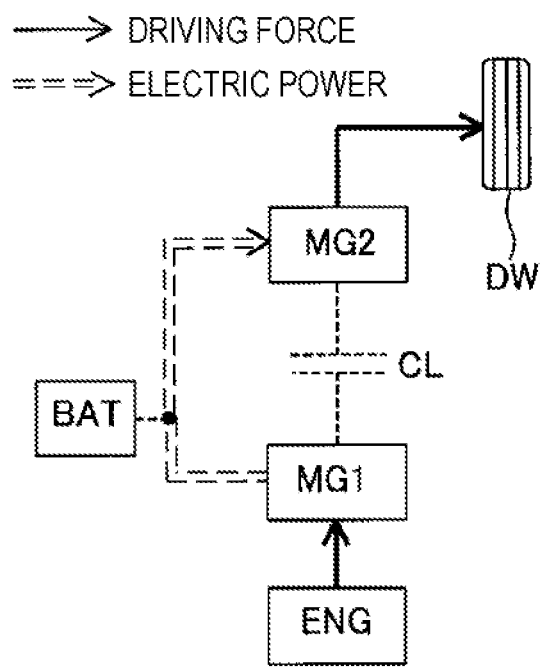
FIG. 4 is a schematic diagram showing transmission of driving force and electric power, under a series running mode.
Figure 5:
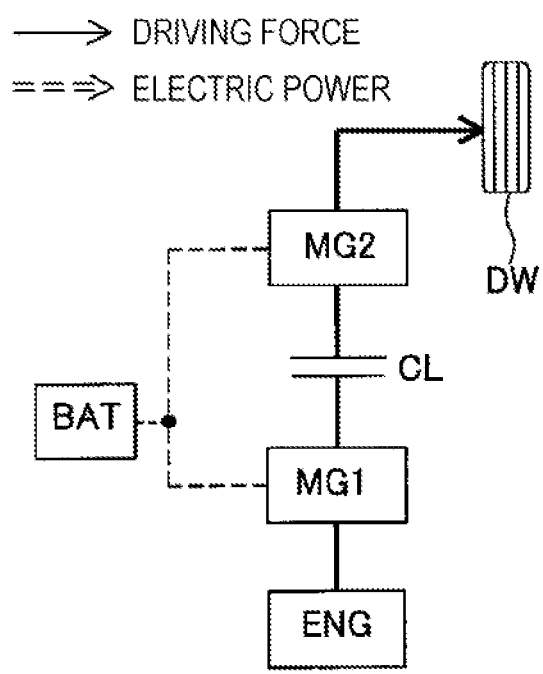
FIG. 5 is a schematic diagram showing transmission of driving force and electric power, under an engine running mode.

When the vehicle 1 runs in the EV running mode, the driving force of the first motor generator MG1 and/or the second motor generator MG2 is utilized, as shown in FIGS. 3A to 3C. When the vehicle 1 runs in the series running mode, the clutch CL is disconnected and the driving force of the second motor generator MG2 is utilized, as shown in FIG. 4. In the series running mode, the power generated by the first motor generator MG1 upon being driven by the engine ENG is supplied to the second motor generator MG2, so as to allow the second motor generator MG2 to output a driving force that accords with the output required by the vehicle, based on the vehicle speed V and the AP aperture. Here, the series running mode is selected when the output required by the vehicle 1 is equal to or higher than a predetermined value, or when the vehicle speed V is equal to or higher than a predetermined value. When the vehicle 1 runs in the engine running mode, the clutch CL is connected, and the driving force from the engine ENG is utilized, as shown in FIG. 5.

Outline of Manual Drive Control

When the manual drive control is selected in the vehicle 1, the vehicle 1 is controlled (acceleration, deceleration, and steering are controlled) through conventional operation by the driver, without the intermediation of the automated drive control unit 110. In the manual drive control, the engine ENG, the first and second motor generators MG1 and MG2, and the clutch CL are controlled on the basis of the detection information from the accelerator aperture sensor 71, one of the operation detection sensors. In addition, the brake unit 94 is controlled on the basis of the detection information from the brake stroke sensor 73. Through such control, the acceleration and deceleration of the vehicle 1 are controlled. Further, the steering unit 92 is controlled on the basis of the detection information from the steering angle sensor 75. The steering of the vehicle 1 is thus performed.

Outline of Automated Drive Control

When the automated drive control is selected in the vehicle 1, the automated drive control unit 110 performs the automated drive control for the vehicle 1. In the automated drive control, the automated drive control unit 110 recognizes the current running condition (actual running path, running position, and so forth) of the vehicle 1, on the basis of the information acquired from the outside status acquisition unit 12, the route information acquisition unit 13, and the running condition acquisition unit 14, or the information recognized through the own position recognition unit 112 and the surrounding situation recognition unit 114. The target running condition setting unit 118 sets the target running condition (target path, target position, and so forth), to be realized by the vehicle 1, on the basis of the action plan generated by the action plan generation unit 116. The deviation acquisition unit 42 acquires a deviation of the actual running condition from the target running condition. The drive control unit 120 controls, when the deviation acquisition unit 42 acquires a deviation, the vehicle 1 so as to match the running condition of the vehicle 1 with, or bring the running condition of the vehicle 1 closer to, the target running condition.

The correction unit 44 corrects the target path or the target position, on the basis of the running position acquired by the running position acquisition unit 26. The drive control unit 120 controls the acceleration and deceleration of the vehicle 1, through the traction force (driving force) output unit 90 and the brake unit 94, on the basis of the vehicle speed acquired by the vehicle speed acquisition unit, so as to allow the vehicle 1 to follow up the revised target path or revised target position.

In addition, the correction unit 44 corrects the target path, on the basis of the running position acquired by the running position acquisition unit 26. The drive control unit 120 performs the steering control through the steering unit 92, on the basis of the steering angular speed acquired by the steering angle acquisition unit 32, so as to allow the vehicle 1 to follow up the revised target path.

Drive Mode Switching Control

Now, the control device 100 of the vehicle 1 according to this embodiment performs the drive mode switching control, when a request for switching to the manual drive control is made during the execution of the automated drive control, to switch the drive mode of the traction force (driving force) output unit 90 (i.e., running mode of the vehicle 1) to one of the plurality of drive modes that allows the driving force to accord with a required driving force based on the operation of the driver, over a wide range in which a larger driving force can be used in that mode, which is larger than those allowed in the other drive modes. Hereunder, further details of the drive mode switching control will be described.

Figure 6:
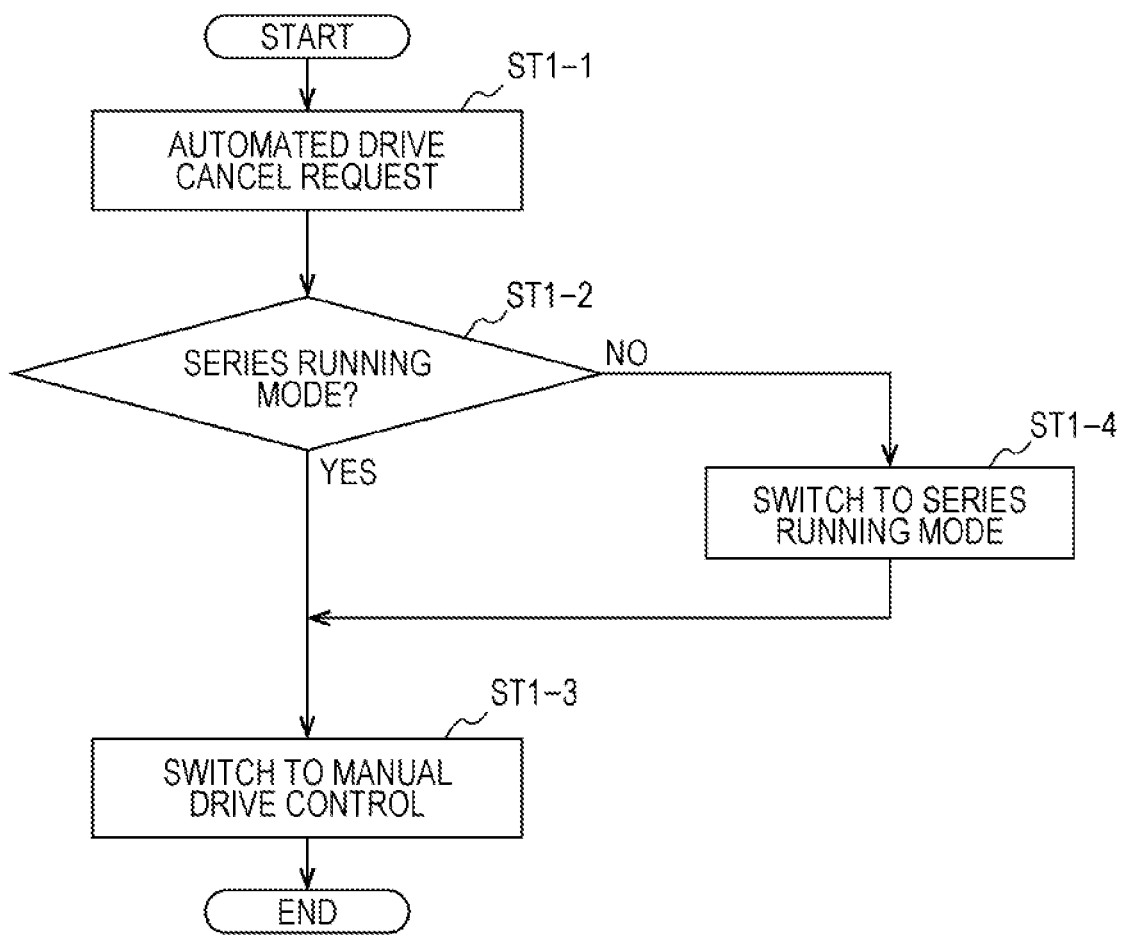
FIG. 6 is a flowchart showing a process of a drive mode switching control.

FIG. 6 is a flowchart showing a process of the drive mode switching control. The drive mode switching control is performed when an automated drive cancellation request is made (ST1-1), during the execution of the automated drive control. The automated drive cancellation request is issued from the driver or the system of the vehicle 1, to cancel the automated drive control of the vehicle 1 and to switch to the manual drive control. As specific examples, the automated drive cancellation request can be assumed to have been made, when a request for switching to the manual drive control is generated by the system of the vehicle 1, during the execution of the automated drive control, according to the running condition of the vehicle 1, when a request for switching from the automated drive control to the manual drive control is generated through the operation of the select switch 80 by the driver, and when the driver has operated the accelerator pedal 70, the steering wheel 74, or the brake pedal 72, either normally or over a predetermined stroke.

When the automated drive cancellation request is thus made, it is decided whether the running mode of the vehicle 1 is the series running mode (ST1-2). In the case where the series running mode is selected (YES), the switching to the manual drive control is immediately performed (ST1-3). In the case where the series running mode is not selected (NO), the running mode is switched to the series running mode (ST1-4), after which the switching to the manual drive control is performed (ST1-3).

As described above, in the vehicle 1 according to this embodiment, the drive mode that allows the driving force to accord with the required driving force based on the operation of the driver, over a wide range, is the series running mode (a first drive mode in this embodiment), among the plurality of drive modes (running mode), namely the EV running mode, the series running mode, and the engine running mode (apparently, the EV running mode and the engine running mode are a second drive mode in this embodiment). Accordingly, when the automated drive cancellation request is made as above, first it is decided whether the series running mode is selected, and in the case where a different running mode is selected, that mode is switched to the series running mode, before shifting to the manual drive control.

Here, instead of switching from the automated drive control to the manual drive control, after switching to the series running mode, under the drive mode switching control, the switching to the series running mode and the switching from the automated drive control to the manual drive control may be performed at the same time.

Figure 7:
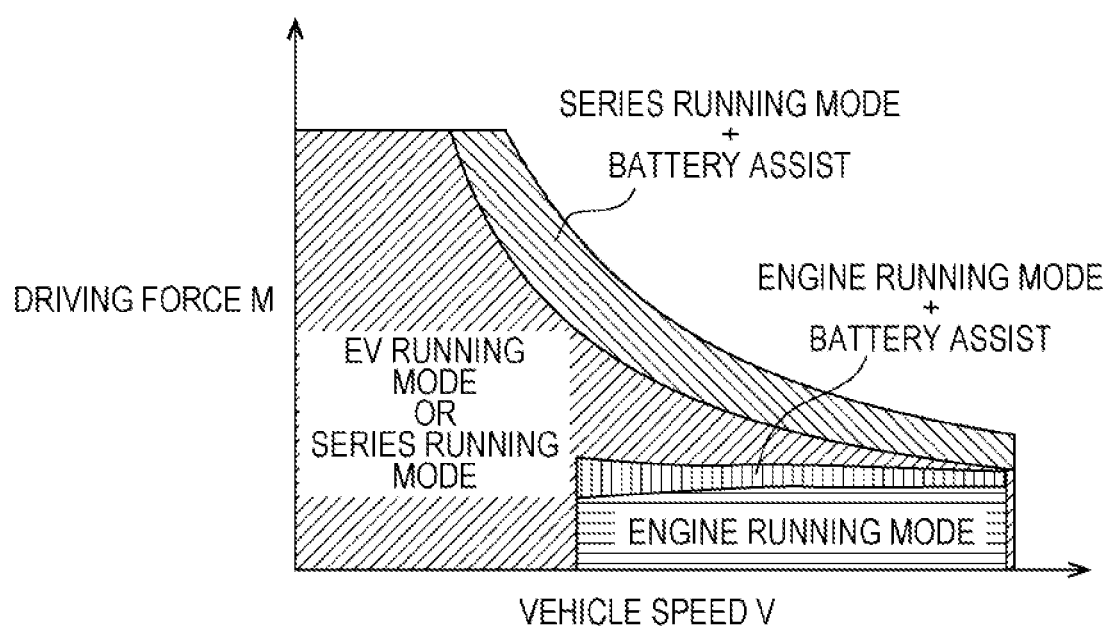
FIG. 7 is a driving force line graph showing a relation between vehicle speed and driving force, under each of the drive modes.

FIG. 7 is a driving force line graph showing a relation between vehicle speed and driving force in the vehicle 1 according to this embodiment, under each of the drive modes. As shown in FIG. 7, the running mode that allows the driving force to accord with the required driving force over a wide range, is the EV running mode or the series running mode, among the running modes of the vehicle 1, namely the EV running mode, the series running mode, the engine running mode, the series running mode with battery assistance, and the engine running mode with battery assistance. With the EV running mode, in which only the driving force of the motor generators MG1 and MG2 is utilized to let the vehicle 1 run, the range of the driving force that can be attained differs depending on the SOC of the battery BAT that supplies power to the motor generators MG1 and MG2. Accordingly, a sufficient range of the driving force that accords with the required driving force may not always be attained, depending on the condition of the system such as the SOC of the battery BAT. Thus, an appropriate driving force that accords with the driving force, required through the operation of the driver of the vehicle 1 performed under the manual drive control, may fail to be outputted. Therefore, it is desirable to switch to a mode other than the EV running mode.

For the mentioned reason, under the drive mode switching control according to this embodiment, the series running mode is selected, since the operation range on the driving force line graph is widest, and the driving force that can be outputted does not depend on the SOC of the energy storage.

As described above, with the vehicle control device 100 according to this embodiment, the drive mode switching control is performed, when a request for switching to the manual drive control is made during execution of the automated drive control, to switch the drive mode of the traction force (driving force) output unit 90 to one of the plurality of drive modes that allows the driving force to accord, over a wide range, with the required driving force based on the operation of the driver of the vehicle 1. Accordingly, an appropriate driving force, which accords with the driving force required through the operation of the driver of the vehicle 1, can be outputted at the time of switching, or immediately after the switching, to the manual drive control. Therefore, the driver of the vehicle 1 can smoothly and naturally take over the operation of the vehicle, when the automated drive control is switched to the manual drive control.

In addition, in the series running mode, the vehicle 1 is made to run by operating the engine ENG. The term "operate the engine ENG" herein refers not only to operating the engine ENG to output the driving force for making the vehicle 1 run, but also to operating the engine ENG for other purposes, such as power generation.

In the running mode in which the engine ENG is operated to let the vehicle 1 run, the range of the driving force that can be outputted can be increased. Accordingly, setting to the series running mode, in which the engine ENG is operated to let the vehicle 1 run, under the drive mode switching control, enables an appropriate driving force that accords with the driving force, required through the operation of the driver of the vehicle, to be outputted under the manual drive control.

In the vehicle control device 100, the traction force (driving force) output unit 90 is configured to switch between the series running mode, in which the driving force of the motor generators MG1 and MG2 is utilized to let the vehicle 1 run, and the engine ENG is primarily utilized for power generation, and the parallel running mode in which the driving force of either or both of the motor generators MG1 and MG2 and the engine ENG is utilized to let the vehicle 1 run, and the running mode that allows the driving force to accord with the required driving force over a wide range is the series running mode.

Whereas the traction force (driving force) output unit 90 of the vehicle 1 according to this embodiment is configured to switch between the series running mode, in which the driving force of the motor generators MG1 and MG2 is utilized to let the vehicle 1 run, and the engine ENG is primarily utilized for power generation, and the parallel running mode in which the driving force of either or both of the motor generators MG1 and MG2 and the engine ENG is utilized to let the vehicle 1 run, the series running mode provides a wider range of driving force that accords with the required driving force (i.e., provide a higher degree of freedom of driving force) compared with the parallel running mode, because the operation range of the series running mode on the driving force line graph is wider, and also because the driving force that can be outputted does not depend on the SOC of the energy storage. Therefore, switching to the series running mode under the drive mode switching control enables outputting of an appropriate driving force that accords with the driving force, required through the operation of the driver of the vehicle 1 performed under the manual drive control.

Further, in the traction force (driving force) output unit 90 according to this embodiment, a mechanism for varying the rotation of the driving force, such as a planetary gear mechanism or a transmission mechanism, is not interposed between the engine ENG and the driving wheels WR and WL. Accordingly, the running mode that provides a wider range of driving force that accords with the required driving force is the series running mode, in which the driving force of the engine ENG is primarily utilized for power generation, rather than the parallel running mode in which the driving force of the engine ENG is utilized to let the vehicle run. However, with a traction force (driving force) output unit of a different configuration, in which a mechanism for varying the rotation of the driving force, such as a planetary gear mechanism or a transmission mechanism, is interposed between the engine ENG and the driving wheels WR and WL, the parallel running mode may provide a wider range of driving force that accords with the required driving force, compared with the series running mode, because the range of the driving force that can be attained can be increased, by utilizing the driving force of the engine ENG to let the vehicle run.

Second Embodiment

Hereunder, a second embodiment of the present disclosure will be described. In the description of the second embodiment, as well as the corresponding drawings, the elements same as, or corresponding to, those of the first embodiment are given the same numeral, and detailed description thereof will be omitted. The configurations not referred to hereunder, or not illustrated in the corresponding drawings, are the same as those of the first embodiment.

Figure 8:
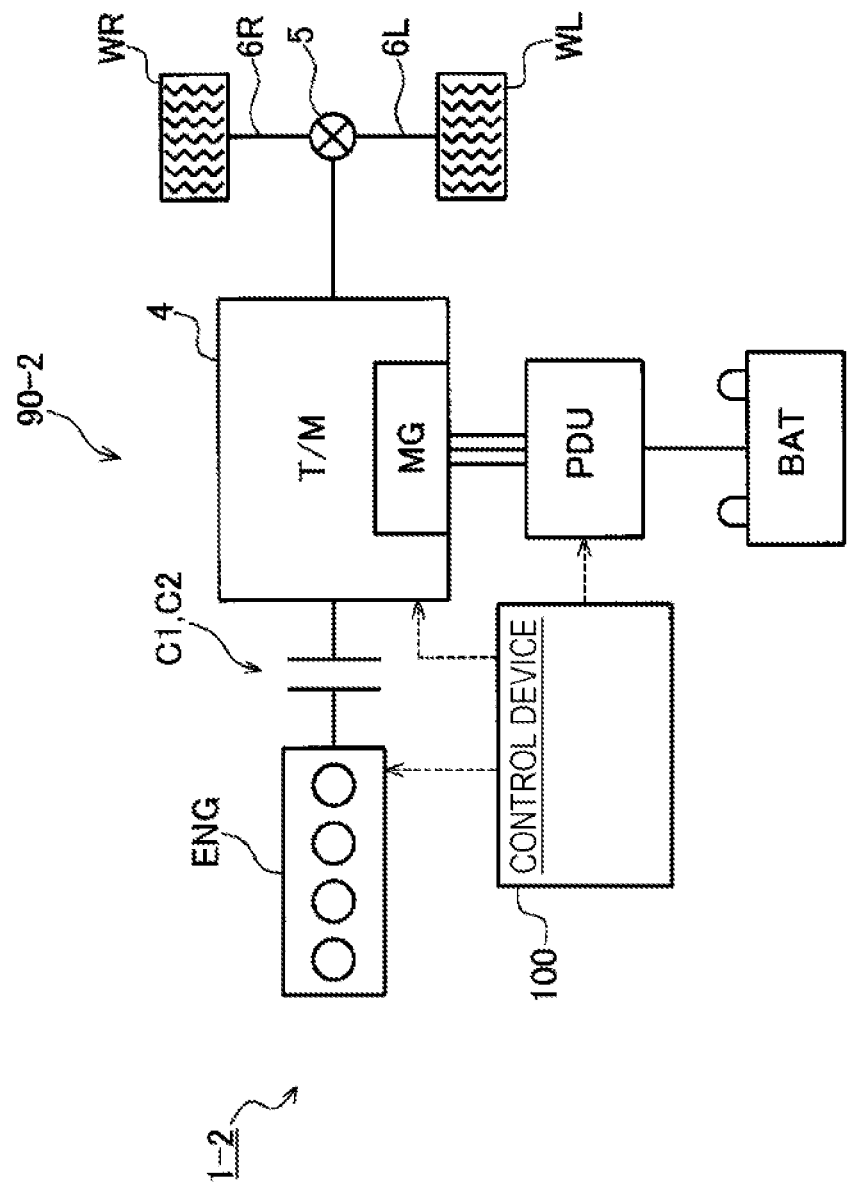
FIG. 8 is a schematic diagram showing a configuration of a traction force (driving force) output unit (driving unit) of a vehicle, according to a second embodiment.

A vehicle 1-2 according to the second embodiment is, as shown in FIG. 8, a hybrid vehicle including the engine ENG and the motor generator MG acting as the drive source. A transmission 4 in a traction force (driving force) output unit 90-2 of the vehicle 1-2 according to this embodiment is a parallel-shaft transmission having seven stages for forward running and one stage for reverse running, and is a dry twin clutch transmission or dual clutch transmission (DCT) (see FIG. 9).

The vehicle 1-2 also includes a power drive unit PDU for controlling the motor generator MG, the battery (energy storage) BAT, the differential mechanism 5, left and right drive shafts 6L and 6R, and left and right driving wheels WL and WR. The rotational driving force of the engine ENG and the motor generator MG is transmitted to the left and right driving wheels WL and WR, via the transmission 4, the differential mechanism 5, and the drive shafts 6R and 6L.

The engine ENG is an internal combustion engine that generates the driving force for letting the vehicle 1-2 run. The motor generator MG generates the driving force for letting the vehicle 1-2 run, utilizing the electric energy from the battery BAT, in the case of a collaborative drive with the engine ENG and the motor generator MG, or drive with the motor generator MG alone. When the vehicle 1-2 is decelerated, the motor generator MG acts as a generator that generates power with the regenerative power of the motor generator MG. By the regeneration of the motor generator MG, the battery BAT is charged with the power generated by the motor generator MG (i.e., regenerative energy), to supply and receive power to and from the motor generator MG.

Figure 9:
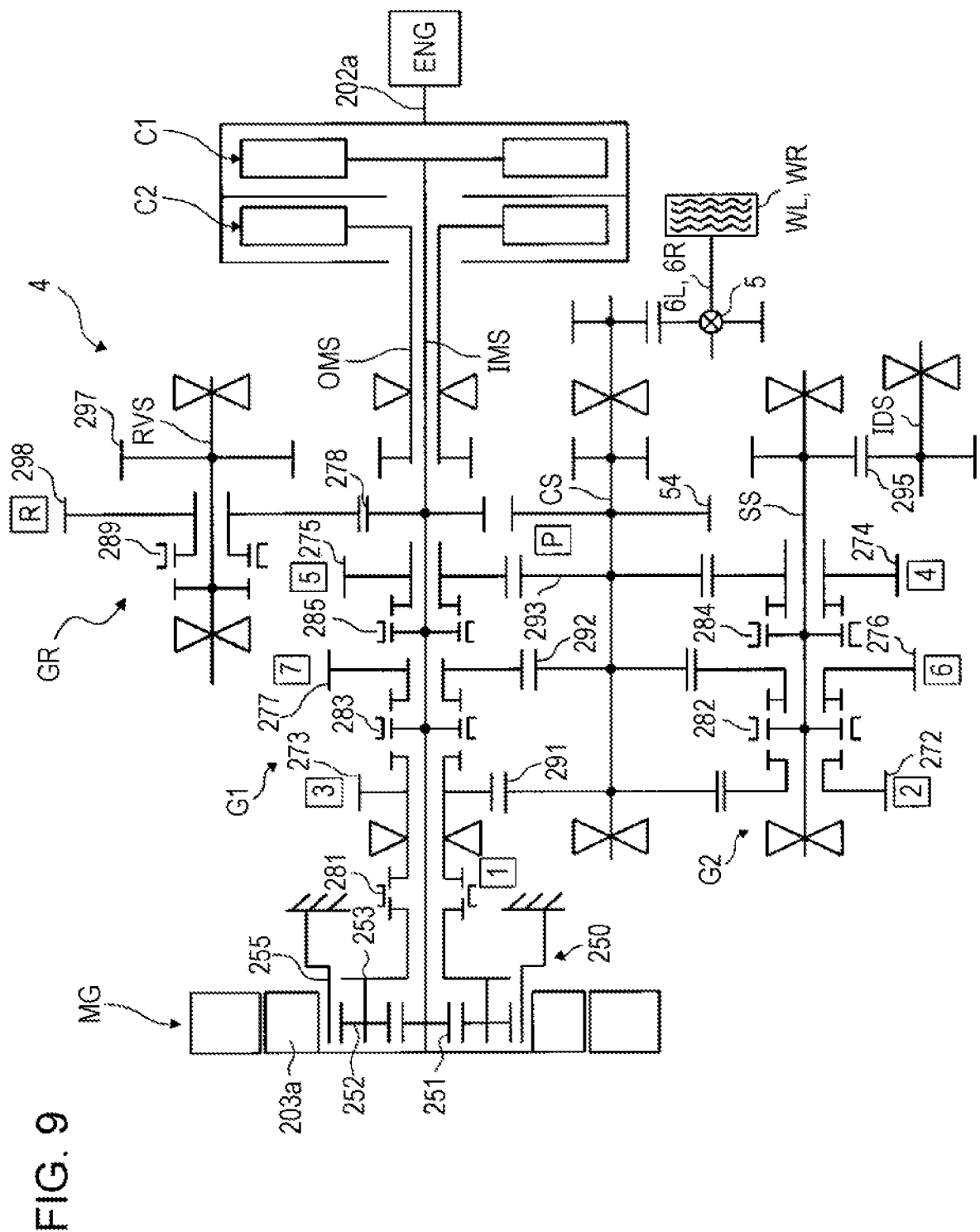
FIG. 9 is a skeleton diagram of the transmission shown in FIG. 8.

Hereunder, a configuration of the transmission 4 in the traction force (driving force) output unit 90-2 of the vehicle 1-2 according to this embodiment will be described. FIG. 9 is a skeleton diagram of the transmission 4 shown in FIG. 8.

The transmission 4 includes a first input shaft IMS selectively connected to an engine output shaft 202a of the engine ENG via a first clutch C1, a second input shaft SS selectively connected to an engine output shaft 202a of the engine ENG via a second clutch C2, and an output shaft CS connected to the first input shaft IMS and the second input shaft SS via a transmission gear mechanism.

Gears of odd-numbered stages (first, third, fifth, and seventh speed) are provided on the first input shaft IMS, and gears of even-numbered stages (second, fourth, and sixth speed) are provided on the second input shaft SS. The output shaft CS is connected to the differential mechanism 5, to output a rotational driving force corresponding to the transmission stage selected for the driving wheels WL and WR.

In addition, a planetary gear mechanism 250 is provided at an end portion of the first input shaft IMS. A rotor 203a of the motor generator MG is connected to the first input shaft IMS, so that the rotor 203a of the motor generator MG rotates about the planetary gear mechanism 250. With such configuration, the transmission 4 acts as the transmission of the hybrid vehicle, utilizing the engine ENG and the motor generator MG as the drive source for the vehicle 1-2.

An outer main shaft OMS is connected to the output side of the second clutch C2, the outer main shaft OMS being concentrically arranged with the first input shaft IMS, so as to form an outer sleeve thereof. The outer main shaft OMS is constantly engaged with a reverse shaft RVS and the second input shaft SS via an idle shaft IDS, so that the rotational output of the second clutch C2 is transmitted to the reverse shaft RVS and the second input shaft SS. These shafts are parallel to each other.

A first transmission mechanism G1, configured to set the odd-numbered transmission stages, will be described hereunder. On the first input shaft IMS, a third-speed drive gear 273, a seventh-speed drive gear 277, and a fifth-speed drive gear 275 are concentrically arranged, so as to rotate relative to each other. A third-seventh-speed synchronized mesh mechanism 283 is provided between the third-speed drive gear 273 and the seventh-speed drive gear 277 so as to slide in the axial direction, and a fifth-speed synchronized mesh mechanism 285 is provided for the fifth-speed drive gear 275, so as to slide in the axial direction.

With the mentioned configuration, one or a plurality of first synchronized meshing units (first-speed synchronized mesh mechanism 281, third-seventh-speed synchronized mesh mechanism 283, fifth-speed synchronized mesh mechanism 285) provided on the first input shaft IMS are moved, to select a desired gear of the odd-numbered transmission stage (planetary gear mechanism 250 for the first-speed drive gear, third-speed drive gear 273, fifth-speed drive gear 275, seventh-speed drive gear 277). Accordingly, the desired transmission stage is connected to the first input shaft IMS.

Each of the drive gears of the first transmission mechanism G1 is meshed with a corresponding one of output gears provided on the output shaft CS. More specifically, the third-speed drive gear 273 is meshed with a first output gear 291, the seventh-speed drive gear 277 is meshed with a second output gear 292, and the fifth-speed drive gear 275 is meshed with a third output gear 293. With such engagement, the output shaft CS is rotationally driven.

A second transmission mechanism G2, configured to set the even-numbered transmission stages, will be described hereunder. On the second input shaft SS, a second-speed drive gear 272, a sixth-speed drive gear 276, and a fourth-speed drive gear 274 are concentrically arranged, so as to rotate relative to each other. A second-sixth-speed synchronized mesh mechanism 282 is provided between the second-speed drive gear 272 and the sixth-speed drive gear 276 so as to slide in the axial direction, and a fourth-speed synchronized mesh mechanism 284 is provided for the fourth-speed drive gear 274, so as to slide in the axial direction.

With the mentioned configuration, one or a plurality of second synchronized meshing unit (second-sixth-speed synchronized mesh mechanism 282, fourth-speed synchronized mesh mechanism 284) provided on the second input shaft SS are moved, to select a desired gear of the even-numbered transmission stage (second-speed drive gear 272, fourth-speed drive gear 274, sixth-speed drive gear 276). Accordingly, the desired transmission stage is connected to the second input shaft SS.

Each of the drive gears of the second transmission mechanism G2 is meshed with a corresponding one of output gears provided on the output shaft CS. More specifically, the second-speed drive gear 272 is meshed with the first output gear 291, the sixth-speed drive gear 276 is meshed with the second output gear 292, and the fourth-speed drive gear 274 is meshed with the third output gear 293. With such engagement, the output shaft CS is rotationally driven.

At the end portion of the first input shaft IMS on the side of the motor generator MG, the planetary gear mechanism 250 is provided. The planetary gear mechanism 250 includes a sun gear 251, a pinion gear 252, a carrier 253, and a ring gear 255. The sun gear 251 is fixed to the first input shaft IMS, so as to rotate interlocked with the first input shaft IMS and the motor generator MG. The ring gear 255 is fixed to the casing of the transmission 4, to output a transmission output from the carrier 253 of the pinion gear 252.

The first-speed synchronized mesh mechanism 281 is provided between the carrier 253 of the planetary gear mechanism 250 and the third-speed drive gear 273 on the first input shaft IMS. When the first-speed synchronized mesh mechanism 281 is turned on according to the selection of the first-speed gear, the carrier 253 and the third-speed drive gear 273 on the first input shaft IMS are connected. Then the driving force of the carrier 253 rotationally drives the output shaft CS, via the third-speed drive gear 273 and the first output gear 291.

A reverse transmission mechanism GR for setting the reverse stage will be described hereunder. A gear 297 to be meshed with an idle gear 295 on the idle shaft IDS is fixed to the reverse shaft RVS. In addition, a reverse gear stage, for selectively connecting the reverse shaft RVS to the first input shaft IMS, is provided on the outer circumference of the reverse shaft RVS. The reverse gear stage includes a reverse drive gear 298 concentrically arranged with the reverse shaft RVS so as to rotate relative to each other, and a reverse synchronized mesh mechanism 289 for selectively connecting the reverse drive gear 298 to the reverse shaft RVS. The reverse drive gear 298 is meshed with a gear 278 fixed to the first input shaft IMS.

The reverse synchronized mesh mechanism 289 is set to slide axially of the reverse shaft RVS. In the case of forward running, the reverse synchronized mesh mechanism 289 does not engage the reverse shaft RVS with the reverse drive gear 298. In the case of reverse running, in contrast, the reverse synchronized mesh mechanism 289 engages the reverse shaft RVS with the reverse drive gear 298.

In the transmission 4 configured as above, when the synchronizer sleeve of the second-sixth-speed synchronized mesh mechanism 282 is made to slide to the left, the second-speed drive gear 272 is connected to the secondary shaft SS, and when the synchronizer sleeve is made to slide to the right, the sixth-speed drive gear 276 is connected to the secondary shaft SS. Further, when the synchronizer sleeve of the fourth-speed synchronized mesh mechanism 284 is made to slide to the right, the fourth-speed drive gear 274 is connected to the secondary shaft SS. By engaging thus the even-numbered stage clutch C2, with the even-numbered drive gear selected, the transmission 4 is set to the even-numbered transmission stage (second-speed, fourth-speed, or sixth-speed).

Likewise, when the synchronizer sleeve of the first-speed synchronized mesh mechanism 281 is made to slide to the right, the carrier 253 is connected to the third-speed drive gear 273, so that the rotation of the planetary gear mechanism 250 is transmitted to the counter shaft CS via the third-speed drive gear 273, and thus the first-speed transmission stage is selected. When the synchronizer sleeve of the third-seventh-speed synchronized mesh mechanism 283 is made to slide to the left, the third-speed drive gear 273 is connected to the inner main shaft IMS, so that the third-speed transmission stage is selected, and when the synchronizer sleeve is made to slide to the right, the seventh-speed drive gear 277 is connected to the inner main shaft IMS, so that the seventh-speed transmission stage is selected. Further, when the synchronizer sleeve of the fifth-speed synchronized mesh mechanism 285 is made to slide to the right, the fifth-speed drive gear 275 is connected to the inner main shaft IMS, so that the fifth-speed transmission stage is selected. By engaging thus the odd-numbered stage clutch C1, with the odd-numbered drive gear selected, the transmission 4 is set to the odd-numbered transmission stage (first-speed, third-speed, fifth-speed, or seventh-speed).

The transmission 4 configured as above can realize the engine running mode in which only the driving force of the engine ENG is transmitted to the driving wheels WL and WR to let the vehicle 1-2 run, the EV running mode in which only the driving force of the motor generator MG is transmitted to the driving wheels WL and WR to let the vehicle 1-2 run, an assistance running mode (hybrid running mode) in which both the driving force of the engine ENG and the driving force of the motor generator MG are transmitted to the driving wheels WL and WR to let the vehicle 1-2 run, and a regenerative mode in which the motor generator MG performs regeneration while the vehicle 1-2 is running with the driving force of the engine ENG. When the engine ENG is at a stop, for example in the EV running mode, the rotation of the motor generator MG can be transmitted to the engine ENG thus to start up the engine ENG, by connecting the first clutch C1 while the motor generator MG is rotating.

In the vehicle 1-2 according to this embodiment also, when a request for switching to the manual drive control is made during execution of the automated drive control, the drive mode switching control is performed to switch the drive mode of the traction force (driving force) output unit 90-2 to one of the plurality of drive modes that allows the driving force to accord, over a wide range, with the required driving force based on the operation of the driver of the vehicle 1-2. Hereunder, further details of the drive mode switching control will be described.

Figure 10:
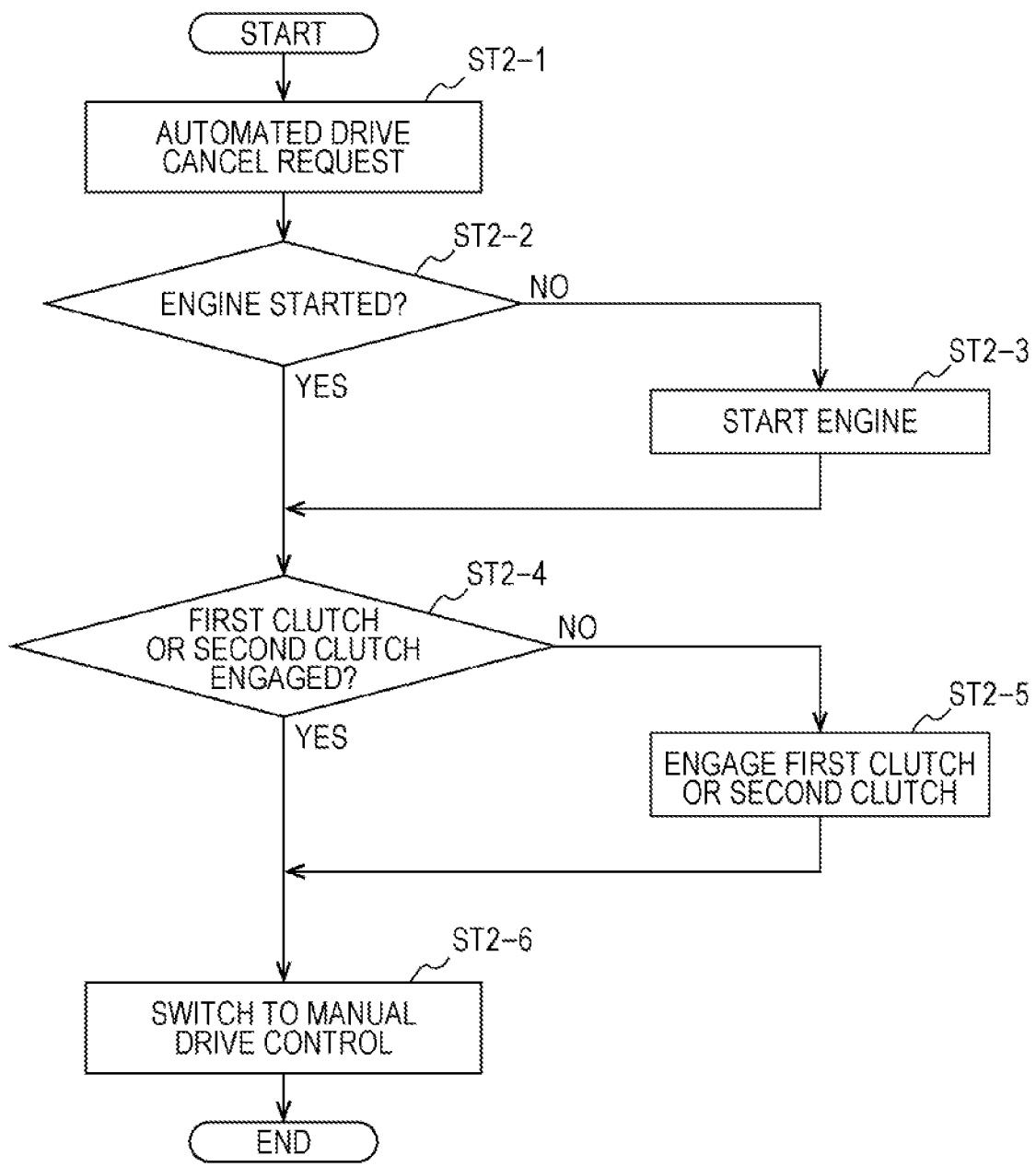
FIG. 10 is a flowchart showing another process of the drive mode switching control.

FIG. 10 is a flowchart showing another process of the drive mode switching control. The drive mode switching control is performed when an automated drive cancellation request is made (ST2-1), during the execution of the automated drive control. When the automated drive cancellation request is made, it is decided whether the engine ENG is in operation, in the running mode of the vehicle 1-2 (ST2-2). In the case where the engine ENG is already in operation (YES), the process proceeds to ST2-4. In the case where the engine ENG is not in operation but at a stop (NO), the engine ENG is started up (ST2-3), and then the process proceeds to ST2-4. At ST2-4, it is decided whether one of the first clutch C1 and the second clutch C2 is engaged (connected). In the case where one of the first clutch C1 and the second clutch C2 is engaged (YES), the switching to the manual drive control is immediately performed (ST2-6). In contrast, in the case where neither of the first clutch C1 and the second clutch C2 are engaged (NO), one of the first clutch C1 and the second clutch C2 is engaged (ST2-5), to transmit the driving force of the engine ENG to the first input shaft IMS or the second input shaft SS, and then the switching to the manual drive control is performed (ST2-6).

As described above, in the vehicle 1-2 according to this embodiment, the drive mode that allows the driving force to accord with the required driving force based on the operation of the driver, over a wide range, is the engine running mode, in which one of the first clutch C1 and the second clutch C2 is connected to the engine ENG (engine output shaft 202a) while the engine ENG is in operation, to let the vehicle 1-2 run. Accordingly, when the request to cancel the automated drive control is made, it is decided whether the engine ENG is in operation, as well as whether one of the first clutch C1 and the second clutch C2 are engaged. Then the engine ENG is started up if not in operation yet, and one of the first clutch C1 and the second clutch C2 is engaged if neither are engaged, after which the switching to the manual drive control is performed.

With the traction force (driving force) output unit 90-2 including the transmission 4 according to this embodiment, the running mode in which the engine ENG is in operation provides a wider range of driving force that accords with the required driving force (i.e., provides a higher degree of freedom of driving force). This is because, in the drive mode in which the engine ENG is in operation, utilizing the driving force of the engine ENG leads to increased degree of freedom of the driving force. Therefore, selecting the mentioned drive mode under the drive mode switching control enables outputting of an appropriate driving force that accords with the driving force, required through the operation of the driver of the vehicle 1-2 performed under the manual drive control.

Although some embodiments of the present disclosure have been described as above, the present disclosure is in no way limited to the foregoing embodiments, but may be modified in various manners within the scope of the appended claims, and within the technical scope expressed in the foregoing description and the drawings.

What is claimed is:

1. A vehicle control device comprising:
   a controller configured to allow switching between an automated drive control in which at least one of steering and acceleration or deceleration of a vehicle is automatically controlled and a manual drive control in which the steering and the acceleration or deceleration of the vehicle is manually controlled according to an operation of a driver; and
   a driving force output unit comprising at least one of an internal combustion engine and an electric motor as a drive source and configured to output a driving force for the vehicle to travel in response to a required amount of driving force required by the operation of the driver, the driving force output unit having a plurality of drive modes and being configured to switch between the plurality of drive modes which include at least a first drive mode and a second drive mode, the first and second drive modes having different output-allowable ranges within which the driving force is allowed to output according to the required amount of the driving force, the range of the first drive mode being larger than the range of the second drive mode, wherein
   the control device is configured to control the driving force output unit to switch the drive mode to the first drive mode having the larger output-allowable range when a request for switching to the manual drive control is made during execution of the automated drive control.

2. The vehicle control device according to claim 1, wherein upon receiving the request for switching to the manual drive control, the control device switches from the automated drive control to the manual drive control after the control device switches the drive mode to the first drive mode.

3. The vehicle control device according to claim 1, wherein, upon receiving the request for switching to the manual drive control, the control device switches the drive mode to the first drive mode and switches from the automated drive control to the manual drive control, at a same time.

4. The vehicle control device according to claim 1, wherein the plurality of drive modes include an electric motor running mode in which the vehicle travels only by the driving force from the electric motor, and the first drive mode is one of the drive modes other than the electric motor running mode.

5. The vehicle control device according to claim 1, wherein the plurality of drive modes include running modes in which the vehicle travels at least by the driving force from the internal combustion engine, and the first drive mode is one of the running modes.

6. The vehicle control device according to claim 1, wherein the driving force output unit is configured to switch between:
   a series running mode in which the driving force of the electric motor is utilized to drive the vehicle and the internal combustion engine is primarily utilized for power generation; and
   a parallel running mode in which the driving force of either or both of the electric motor and the internal combustion engine is utilized to drive the vehicle, and the first drive mode comprises the series running mode.

7. The vehicle control device according to claim 1, wherein the driving force output unit includes a transmission comprising:
   a first input shaft connected to the electric motor, and selectively connected to the internal combustion engine via a first power transmission element;
   a second input shaft selectively connected to the internal combustion engine via a second power transmission element;
   an output shaft that outputs driving force to a driving wheel;
   a first transmission mechanism having a plurality of transmission gears selectively engaged with the first input shaft; and
   a second transmission mechanism having another plurality of transmission gears selectively engaged with the second input shaft,
   the plurality of drive modes include an internal combustion engine running mode in which, while the internal combustion engine is in operation, one of the first power transmission element and the second power transmission element is connected to the internal combustion engine, to drive the vehicle with the driving force of the internal combustion engine, and
   the first drive mode comprises the internal combustion engine running mode.

8. The vehicle control device according to claim 1, wherein
   the driving force output unit further comprises the internal combustion engine as the drive source, a first motor generator, a clutch, a second motor generator and a driving wheel which are connected in this order to constitute a transmission route of a driving force, in which a planetary gear mechanism or a transmission mechanism for varying the rotation of the driving force is not interposed between the internal combustion engine and the driving wheel,
   the first drive mode is a series running mode in which the clutch is disconnected, the driving force of the electric motor is utilized to drive the vehicle, and the internal combustion engine and the second motor generator are primarily utilized for power generation, the second drive mode is a parallel running mode in which the clutch is connected, and the driving force of the internal combustion engine is utilized to drive the vehicle, and the driving force output unit switches the drive mode to the series running mode which is the first drive mode having the larger output-allowable range when the request for switching to the manual drive control is made during execution of the automated drive control.

\* \* \* \* \*